(12) United States Patent
Kato et al.

(10) Patent No.: US 7,032,291 B2
(45) Date of Patent: Apr. 25, 2006

(54) METHOD OF MANUFACTURING STATOR WINDING OF ROTARY ELECTRIC MACHINE

(75) Inventors: Mitsuru Kato, Anjo (JP); Yasunori Kitakado, Okazaki (JP); Motohiro Murahashi, Anjo (JP)

(73) Assignee: Denso Corporation, Kariya (JP)

( * ) Notice: Subject to any disclaimer, the term of this patent is extended or adjusted under 35 U.S.C. 154(b) by 381 days.

(21) Appl. No.: 10/462,715

(22) Filed: Jun. 17, 2003

(65) Prior Publication Data

US 2004/0074080 A1 Apr. 22, 2004

(30) Foreign Application Priority Data

Jul. 18, 2002 (JP) ............................. 2002-209004

(51) Int. Cl.
*H02K 15/00* (2006.01)
*H02K 15/14* (2006.01)
*H02K 15/16* (2006.01)

(52) U.S. Cl. ............................. 29/596; 29/597; 29/598; 29/606; 29/732; 29/734; 29/739; 29/792; 29/871; 72/458; 72/479; 140/102.5; 140/106; 310/154.01; 310/156.01

(58) Field of Classification Search ................. 29/596, 29/597, 598, 606, 732, 734, 739, 792, 871; 72/458, 479; 140/102.5, 106; 310/154.01, 310/156.01

See application file for complete search history.

(56) References Cited

U.S. PATENT DOCUMENTS

| 2,476,743 | A | 7/1949 | Leece et al. | |
|---|---|---|---|---|
| 6,177,747 | B1 * | 1/2001 | Maeda et al. | ............... 310/179 |
| 6,249,956 | B1 * | 6/2001 | Maeda et al. | ................. 29/596 |
| 6,339,871 | B1 | 1/2002 | Maesoba et al. | |
| 2001/0007169 | A1 | 7/2001 | Takahashi et al. | |

FOREIGN PATENT DOCUMENTS

| DE | 40 31 276 A1 | 4/1992 |
|---|---|---|
| DE | 100 16 151 A | 10/2000 |

* cited by examiner

*Primary Examiner*—A. Dexter Tugbang
*Assistant Examiner*—Tim Phan
(74) *Attorney, Agent, or Firm*—Oliff & Berridge, PLC

(57) ABSTRACT

A method of manufacturing a stator winding includes a twisting step of U-shaped conductor segments having a pair of straight portions by moving the straight portions in the circumferential direction while restraining the turn portions of the U-shaped conductor segments in the axial direction by a pressing tool. After the previously twisted U-shaped conductor segments are inserted into slots of a stator core, the straight portions are bent in the circumferential direction. The pressing tool is constituted of a stationary top plate that has recesses into which the straight portions are inserted and a movable top plate that is movable to close the recesses after the straight portions are inserted in the recesses.

6 Claims, 11 Drawing Sheets

METHOD OF MANUFACTURING STATOR WINDING OF ROTARY ELECTRIC MACHINE

CROSS REFERENCE TO RELATED APPLICATION

The present application is based on and claims priority from Japanese Patent Application 2002-209004, filed Jul. 18, 2002, the contents of which are incorporated herein by reference.

BACKGROUND OF THE INVENTION

1. Field of the Invention

The present invention relates to a method of manufacturing a stator winding of a rotary electric machine such as a vehicle ac generator to be mounted in a passenger car or a truck.

2. Description of the Related Art

A demand for increasing the output power of a vehicle ac generator has increased as electric load for safety devices is increasing in recent years. In order to meet such a demand, JP-A-2000-350423 proposes "a method of manufacturing a stator winding of a rotary electric machine" which aims to increase the output power by mounting regularly formed U-shaped conductor segments of high density in each slot of a stator core. In this method of manufacturing a stator winding, there is a step for bending U-shaped conductor segments that are inserted into slots by a twisting device, thereby increasing manufacturing speed.

In a stator winding manufactured by this method of manufacturing, lead-specialized U-shaped conductor segments are included besides two kinds of medium U-shaped conductor segments. The lead-specialized U-shaped conductor segments connect the stator winding and the neutral point of Y-connected winding to a rectifier and, therefore, are formed to be longer than the medium U-shaped conductor segments.

The U-shaped conductor segments, each of a pair of straight portions is disposed in a radial direction and is bent in a circumferential direction so that one inclines to a direction opposite to the other at a step of twisting before inserting straight portions of the conductor segments into slots. This step of twisting is carried out by turning an inner ring-shaped tool and an outer ring-shaped tool in opposite circumferential directions while pressing the turn portions of the U-shaped conductor segments that are inserted into through holes formed at the same circumferential pitches of the inner ring-shaped tool and the outer ring-shaped tool by a pressing tool. In the twisting step, the inner and outer ring-shaped tools respectively turn in the opposite circumferential directions while the turn portions of the respective U-shaped conductor segments that are inserted in the through holes of the inner and outer ring-shaped tools are pressed by the pressing tool. Thus, the stator winding is manufactured through various steps after the preformed U-shaped conductor segments are inserted into respective slots of a stator core.

In the method disclosed in the above publication JP-A-2000-350423, besides two kinds of medium U-shaped conductor segments that compose phase coils of a stator winding, lead-specialized U-shaped conductor segments that form lead wires of the respective phase coils are used. Because the lead-specialized U-shaped conductor is longer than the other U-shaped conductor segments, the pressing tool for pressing the turn portions has recesses into which the lead-specialized shape conductor segments are inserted when the straight portions of the respective U-shaped conductor segments are twisted.

In the ac generator disclosed in the above publication JP-A-2000-350423, two leads extending from one of the lead-specialized U-shaped conductor segments are disposed at approximately the same circumferential position of the stator core. Therefore, the through holes of the pressing tool for the medium U-shaped conductor segments have rectangular shape with the longer sides being in parallel to the radial direction.

If a change to the specification of the stator winding is made, two lead wires that are made up of one of the lead-specialized U-shaped conductor segments are not always extended from the same circumferential position and may be extended from different circumferential positions. Therefore, the recesses of the pressing tool for the lead-specialized U-shaped conductor segments are expanded in the circumferential directions, resulting in that the turn portions of the other U-shaped conductor segments disposed in the recesses can not be restrained in the axial direction.

SUMMARY OF THE INVENTION

The present invention has been made in view of the above described problem. The object of the invention is to provide a method of manufacturing a stator winding of a rotary electric machine in which the axial position of the conductor segments can be restrained irrespective of the position of the lead wires.

In order to solve the above described problem, a method of manufacturing a stator winding of a rotary electric machine comprising a twisting step of moving in a circumferential direction to twist both a plurality of U-shaped first conductor segments having a turn portion and a pair of first straight portions disposed in a radial direction and a plurality of U-shaped second conductor segments having a turn portion and a pair of second straight portion disposed at positions shifted from each other in a circumferential direction while restraining the turn portion of the first conductor segments in the axial direction by a pressing tool, a inserting step of inserting the previously twisted first and second conductor segments into one of slots formed in a stator core, a bending step of bending ends of straight portions of the first and second conductor segments opposite the turn portions thereof in the circumferential direction, and a joining step, of joining the previously bent first and second conductor adjacent to each other. Especially, the second straight portions are longer in axial direction than the first straight portions, and the pressing tool comprises a stationary top plate that has a recess into which the straight portion is inserted to protrudes therefrom and a movable top plate that is movable to close the recess after inserting of the second straight portions. If the second straight portions of the second conductor used for lead wires shift in the circumferential direction, a twisting tool having recesses at portions corresponding to the second conductor segments is used at the twisting step. Because the recesses are closed by the movable top plate, the first conductor segments located to correspond to the recesses can be also surely restrained in the axial direction.

It is desirable that the stationary and movable top plates are disposed to be the same axial position at the respective sides on the turn portions. The first conductor segments can be restrained in the axial direction over the entire circumference of the pressing tool.

It is desirable that the movable top plate is accommodated at a circumferential position adjacent to the stationary top plate and moves near the recess before the first and second straight portions move in the circumferential direction at the twisting step and after the second straight portions are inserted into the recess.

It is also desirable that a lead of each phase winding of the stator winding is formed by cutting at least a portion of the second conductor segment after the joining step. As a result, even if the circumferential position of the lead wires is different, the U-shaped second conductor segment can be used, resulting in easily forming of the lead wires.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A method of manufacturing a stator winding of a rotary electric machine according to the first embodiment of the present invention will be described with reference to FIGS. 1–17.

Figure 1:
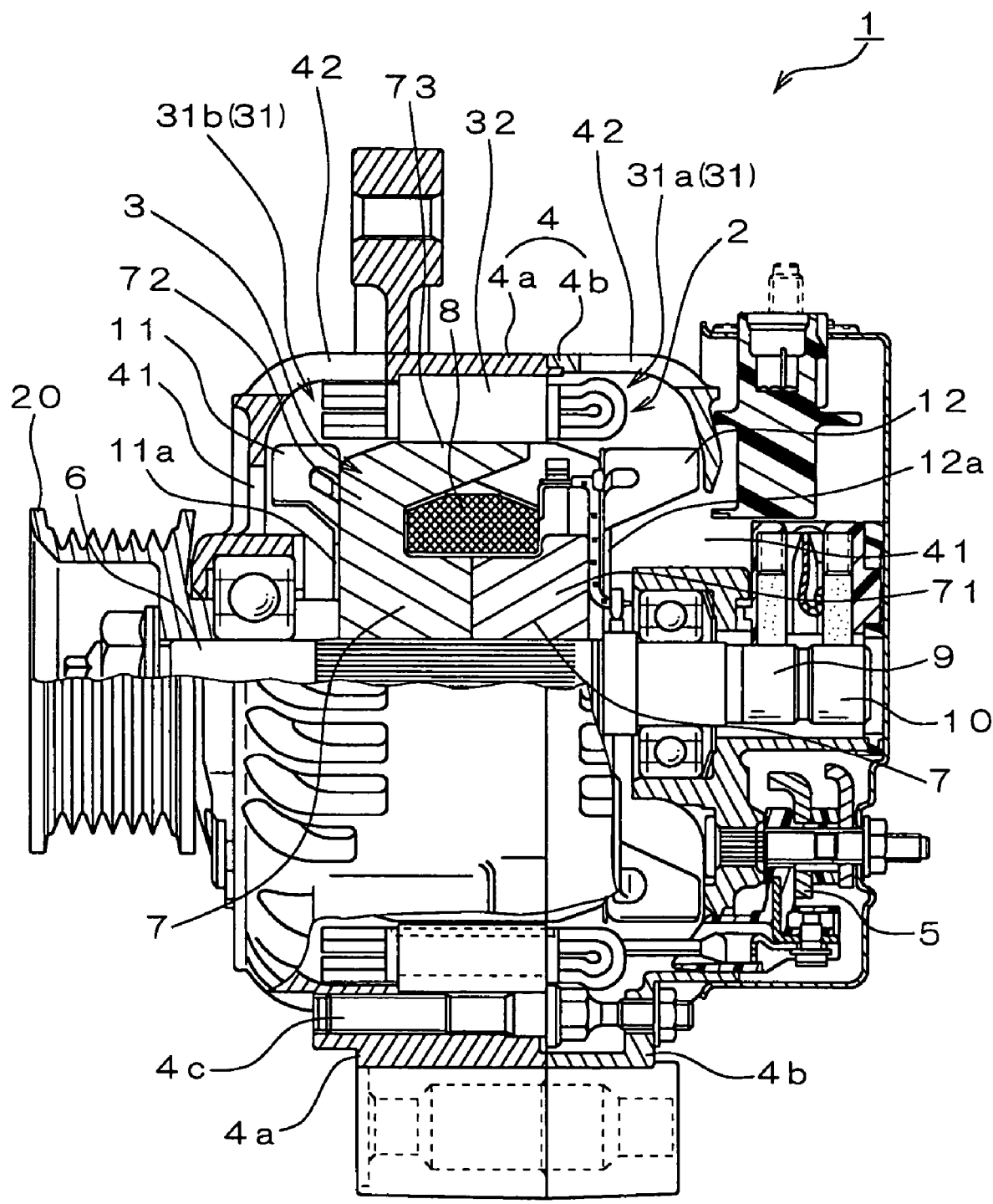
FIG. 1 is a cross-sectional view illustrating the whole structure of a vehicle ac generator according to a preferred embodiment of the invention.

As shown in FIG. 1, the vehicle ac generator 1 according to a preferred embodiment of the invention includes a stator 2, a rotor 3, a housing 4, a rectifier 5, etc.

The rotor 3 functions as a magnetic field member, rotates together with a shaft 6 and includes a Lundell type pole core 7, a field coil 8, slip rings 9, 10, a mixed flow type fan 11 and a centrifugal fan 12, which respectively function as air blowers. The shaft 6 is connected to a pulley 20, which is driven by a vehicle driving engine (not shown).

The Lundell type pole core 7 is composed of a pair of pole core members. The Lundell type pole core 7 includes a boss portion 71, disk portions 72 and twelve magnetic claw poles 73.

The mixed flow type fan 11 has a base plate 11a that is fixed to an end surface of the pole core 7 by a welder or the like, inclined blades that incline sharply to the base plate 11a and vertical blades and rotates together with the rotor 3. The centrifugal fan 12 is disposed at the side remote from the pulley 20 and has only vertical blades that are vertical to a base plate 12a.

The housing 4 is composed of a front housing 4a and a rear housing 4b and has air intake windows 41 at axial ends thereof and air discharging windows 42 at shoulder portions thereof around and opposite a first and second coil-end groups 31a, 31b.

The rectifier 5 that converts the ac output power flowing from the stator 2 to dc power is disposed at an end of the ac generator remote from the pulley 20.

Figure 2:
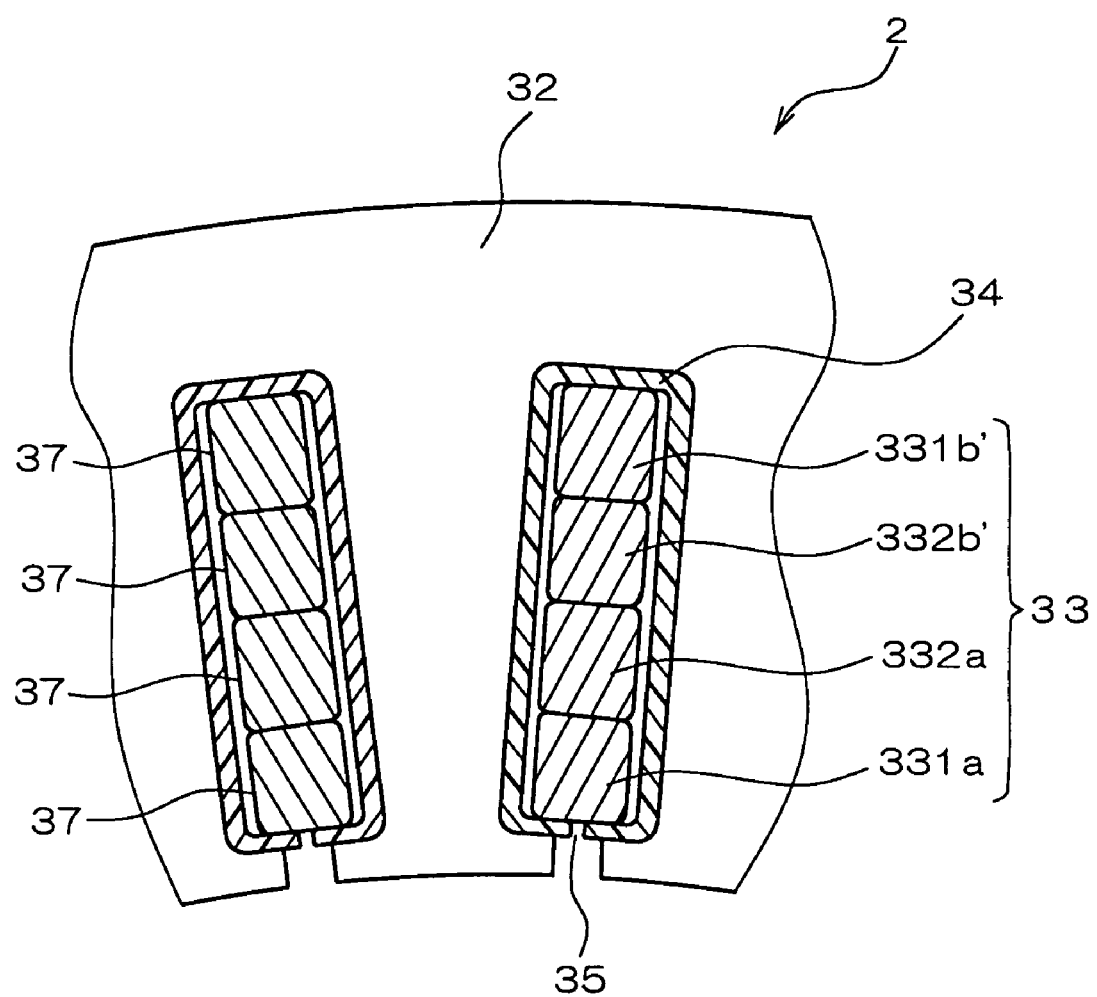
FIG. 2 is a cross-sectional view of a portion of a stator.
Figure 3:
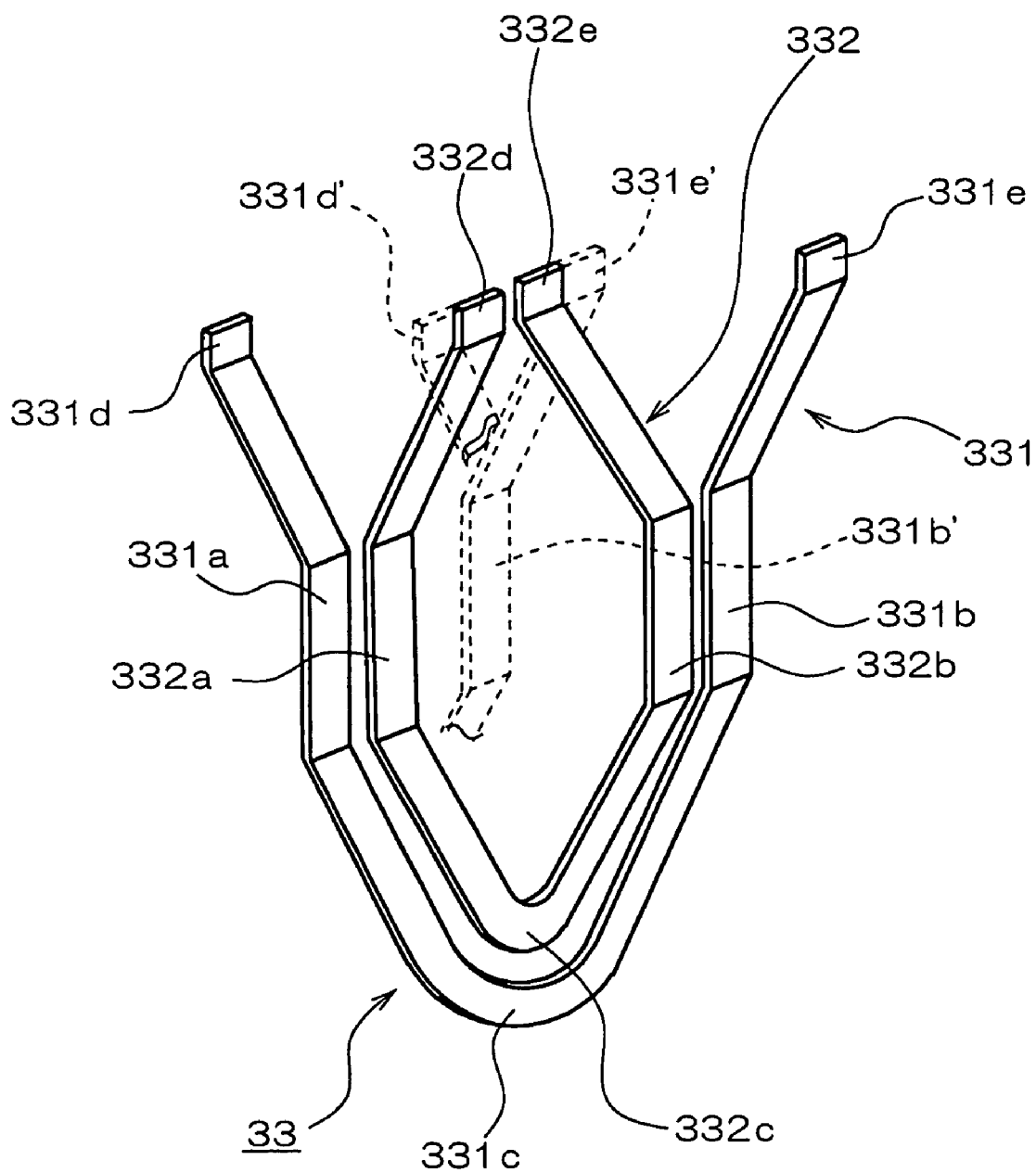
FIG. 3 is a perspective schematic view illustrating first or basic conductor segments to be mounted in a stator core.

Next, the stator 2 will be described in more detail. FIG. 2 is a cross-sectional view of a portion of the stator 2. FIG. 3 is a perspective schematic diagram illustrating conductor segments to be mounted in the stator core 32.

The stator 2 functions as an armature and is composed of a stator core 32, a stator winding 31 that is made up of a plurality of conductor segment unit 33 or conductor segments 331, 332, 333 disposed in a plurality of slots formed in the stator core 32 and insulators 34 for insulating the stator winding 31 from the stator core 32.

As shown in FIG. 2, the stator core 32 has a plurality of slots 35 opening at the inside surface thereof to accommodate the multi-phase stator winding 31. Thirty six (36) slots 35 are formed at equal intervals to accommodate the three-phase stator winding 31 to correspond to a plurality of magnetic poles.

The stator winding 31 mounted in the slots 35 of the stator core 32 can be recognized piece by piece. An even number (e.g. four) of conductors is disposed in each slot 35. Four conductors are disposed in radially aligned layers from the radially inside of the stator core to the radially outside thereof—an innermost layer, an inner middle layer, an outer middle layer and an outermost layer—in each slot 35. The conductors are coated by a polyamideimide film.

Such conductors are connected in a prescribed patterns to form the stator winding 31. One end of the conductor in each slot 35 is connected to another in another slot by a continuous turn portion in the first coil-end group 31a and the other of the conductor is connected to another by welding in the second coil-end group 31b. Lead wires are extended from the rear portion of the first coil-end group 31a in the axial direction to be connected to the rectifier 5 and in the circumferential direction to be connected to form a neutral point of the Y-connected stator winding 31. For this purpose, conductors of special shape are used.

One of the conductors in each slot 35 (except for the conductors of lead-specialized conductor segments) is paired with another conductor in another slot 35 that is a predetermined pole-pitch spaced apart from it. In particular, the conductor in certain one of the layers in one of the slots 35 is paired with the conductor in a different layer in another slot 35 that is a predetermined pole-pitch spaced apart from the former slot so that conductors can be regularly disposed to provide a plurality of gaps among the conductors in the coil end groups.

For example, a conductor 331a in the innermost layer of one of the slots is paired with a conductor 331b in the outermost layer of another slot that is one pole-pitch clockwise spaced apart from the former slot. Similarly, a conductor 332a in the inner middle layer of one of the slots 35 is paired with a conductor 332b in the outer middle layer of another slot that is one pole-pitch clockwise spaced apart from the former slot. The paired conductors are connected by a continuous portion forming the turn portion 331c or 332c at an axial end of the stator core 32. Therefore, at an axial end of the stator core 32, the continuous turn portion that connects the conductors in the outermost layer and the innermost layer surrounds the continuous turn portion that connects the conductors in the outer middle layer and the inner middle layer. Thus, the continuous turn portion that connects the paired conductors is surrounded by the continuous turn portion that connects other paired conductors disposed in the same slots as the former paired conductors at an axial end of the stator core 32. The continuous turn portion that connects the conductor disposed in the outer middle layer and the conductor disposed in the inner middle layer form a middle coil-end, and the continuous turn portion that connects the conductor disposed in the outermost layer and the conductor disposed in the innermost layer form an outer coil-end.

On the other hand, the conductor 332a disposed in the inner middle layer in one slot 35 is paired with a conductor 331a' disposed in the innermost layer in another slot 35 that is one pole-pitch clockwise spaced apart from the former slot 35. Similarly, a conductor 331b' disposed in the outermost layer in one slot 35 is paired with the conductor 332a that is disposed in the outer middle layer in another slot 35 that is one pole-pitch clockwise spaced apart from the former slot 35. Those conductors are connected by welding to each other at the other axial end of the stator core 32 opposite the continuous turn portion to form joint portions.

Therefore, the joint portions of the conductor disposed in the outermost layer and the conductor disposed in the outer middle layer and the joint portions of the conductor disposed in the innermost layer and the conductor disposed in the outer middle layer are aligned in the radial direction at the other axial end of the stator core 32. The joint portions of the conductors in the outermost layer and the conductors in the outer middle layer and the joint portions of the conductors in the innermost layer and the conductors in the inner middle layer form a double-ring-layer coil-end. Thus, the joint portions of the conductors are disposed without overlapping at the other axial end of the stator core 32.

Further, the conductors are provided by U-shaped conductor segments that have an approximately rectangular uniform cross-sectional area (flat rectangular area). As shown in FIG. 3, the conductor disposed in the innermost layer and the conductor disposed in the outermost layer form a continuous large U-shaped conductor segment 331. Likewise, the conductor disposed in the inner middle layer and the conductor disposed in the outer middle layer form a continuous small U-shaped conductor segment 332. These large and small segments form a basic conductor 33. A plurality of the basic conductor 33 is disposed in the slots 35 in a regular pattern to form a stator winding of double turns around the stator core 32.

The lead wires of the stator winding are formed from lead-specialized conductor segments (second conductor segments) 333 that are different from the basic conductor segments (first conductor segments) 331, 332. In the embodiment according to the invention, the lead-specialized conductor segment is longer in a the axial direction than the large conductor segments 331 and the small conductor segments 332. A lead wire is provided by cutting a portion of the lead-specialized conductor segment 333 after the stator winding 31 is formed.

A process of manufacturing the stator winding 31 will be described below.

(Forming step of forming the conductor segments) The large conductor segments 331 and the small conductor segments 332 are formed from a portion of a continuous conductor wire, which are bent along respective mandrels and taken out thereof. The lead-specialized conductor segments 333 for lead wires are formed in a similar manner.

Figure 4:
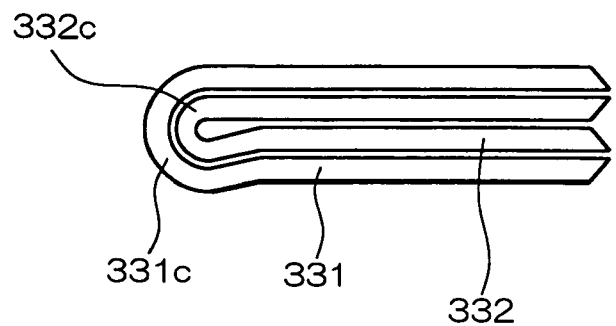
FIG. 4 is a plan view illustrating the basic conductor segments manufactured in a segment forming step.

FIG. 4 illustrates two kinds of the basic segments 33 formed in the forming step. As illustrated in FIG. 4, the small conductor segment 332 is formed by bending a portion of a conductor wire along a mandrel of a prescribed outside diameter. The large conductor segment 331 is formed by bending a portion of a conductor wire along a mandrel of a larger outside diameter than the former mandrel for the small conductor segment 332 so that it surrounds the small conductor segment 332.

Figure 5:
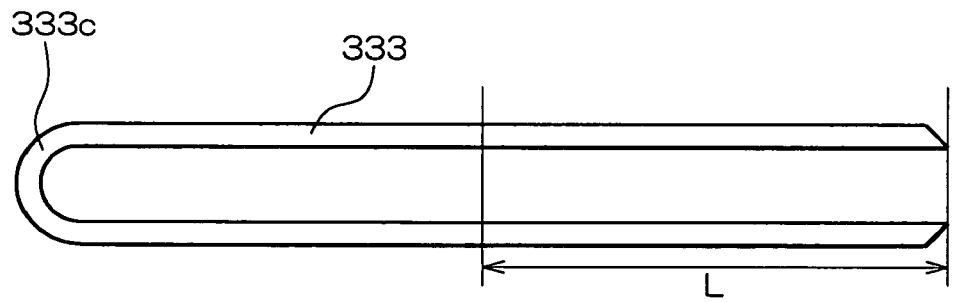
FIG. 5 is a plan view illustrating a second or lead-specialized of lead-specialized conductor segment.

FIG. 5 illustrates the lead-specialized conductor segment. As illustrated in FIG. 5, the lead-specialized conductor segment 333 is formed into an approximately U-shape, whose axial length is larger than the axial length L of the large conductor segment.

(Twisting step) The turn portion 332c of the small conductor segment 332 and the turn portion 331c of the large conductor segment 331 are put together so that the latter surrounds the former, and the straight portions of both small and large segments are inserted into a turn-side twisting tool. After the straight portions of the lead-specialized conductor segment 333 are inserted into the twisting tool, the twisting tool is turned while the each top of the turn portion of the large and small conductor segments is restrained by a pressing tool so that the respective straight portions of the conductor segments are moved and twisted in different circumferential direction.

Figure 6:
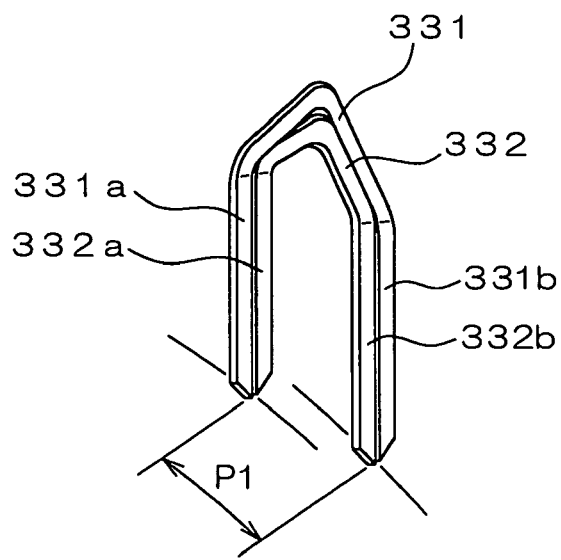
FIG. 6 is a perspective view illustrating large and small segments with portions around turn portions being twisted.

FIG. 6 is a perspective view illustrating each portion around the turn portion of the large conductor segment 331 and the small conductor segment 332 that are twisted in the twisting step. As illustrated in FIG. 6, the large conductor segment 331 whose circumferential pitch P1 between the straight portions 331a and 331b in the twisting step is one pole-pitch and the small conductor segment 332 whose circumferential pitch P between the straight portions 332a and 332b is one pole-pitch are formed.

Figure 7:
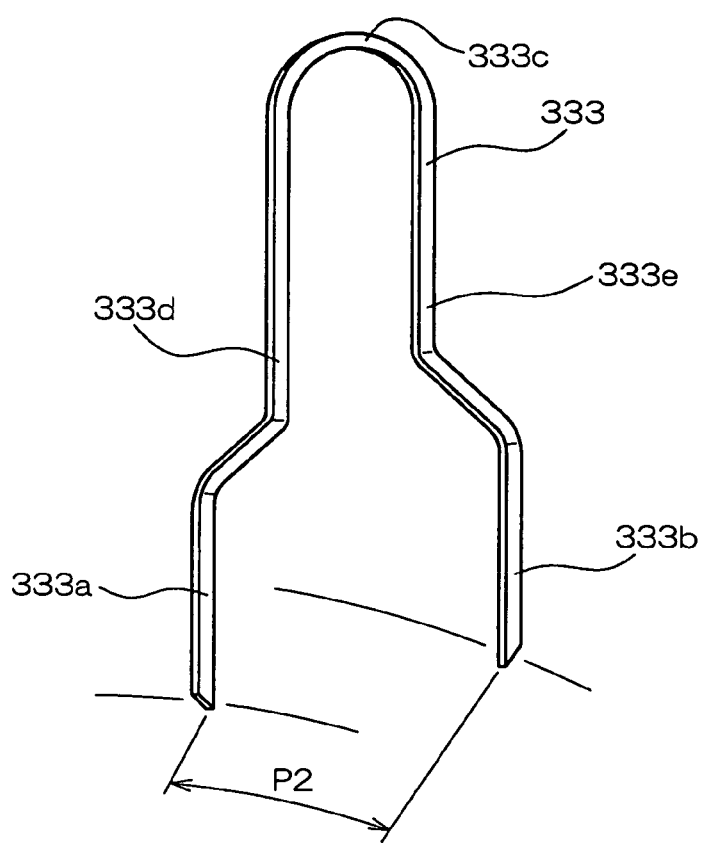
FIG. 7 is a perspective view illustrating the second conductor segment with straight portions being twisted at the middle in the twisting step.

FIG. 7 is a perspective view illustrating the lead-specialized conductor segment 333 that has a straight portion is twisted in the middle in the twisting step. As illustrated in FIG. 7, the circumferential pitch P2 between the end portions of the respective straight portions 333a and 333b is made larger than one pole-pitch in the twisting step. The lead-specialized conductor segment 333 has longer straight portions 333*d*, 333*e* than those of the large and small conductor segments 331, 332, which form a U-shape as a whole.

(Inserting step) the large conductor segments 331, the small conductor segments 332 and the lead-specialized segments 333 are inserted into the slots from portions at one axial end of the stator core 32. As shown in FIG. 2, the straight portions 331*a*, 332*a*, 332*b*' and 331*b*' of the large conductor segment 331 and the small conductor segments 332, which are the above-described conductors, are inserted to one of the slots 35 and aligned in the order from the innermost layer to the outermost layer. The straight portions 332*b*', 331*b*' are straight portions that are paired with straight portions of the large and small conductor segments inserted in another slot 35 that is one pole-pitch spaced apart.

(Bending step) After being inserted, the joint portions 331*d*, 331*e* which are axial ends of the straight portions 331*a*, 331*b* located at the innermost and outermost layers, are bent by a half pole-pitch (e.g. 1.5 slot-pitches) in the direction that the large conductor segment opens out at the second coil-end group 31*b*, where the joint portions 332*d*, 332*e*, which are end portions of the straight portions 332*a*, 332*b* located at the inner middle and outer middle layers, are bent by a half pole-pitch (e.g. 1.5 slot-pitches) in the direction that the small conductor segment closes. As a result, two conductors that are adjacent to each other in the radial direction respectively incline to opposite circumferential directions in the second coil-end group 31*b*. The above steps are repeated until all the conductor segments 33 inserted in the slots 35 are shaped into the above described structure. The straight portion of the lead-specialized conductor segments 333 are also bent in the same manner as described above.

Figure 8:
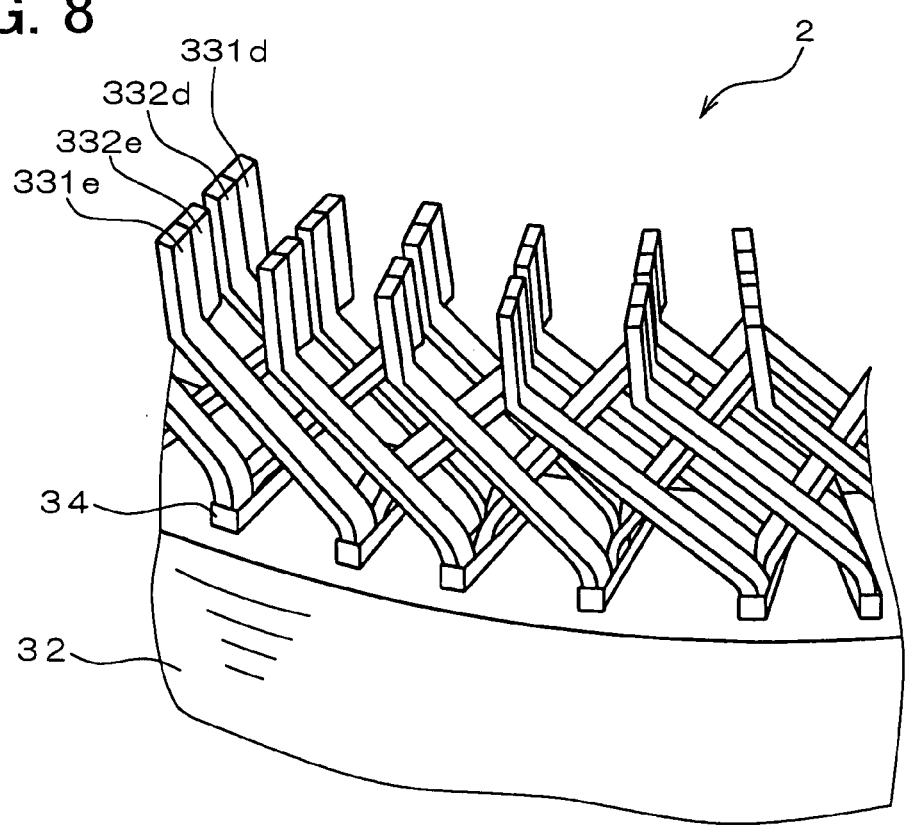
FIG. 8 is a perspective view illustrating a coil-end group on one end of the stator winding.

(Welding step) Thereafter, the second coil-end group 31, the joint portion 331*e* of the outermost layer and the joint portion 332*e* of the outer middle layer and the joint portion 332*d* of the inner middle layer and the joint portion 331*d* of the innermost layer are welded by a welder, such as a supersonic wave welder or an arc welder, or are soldered to be electrically connected, so that the stator 2 as shown in FIG. 8 can be provided.

Figure 9:
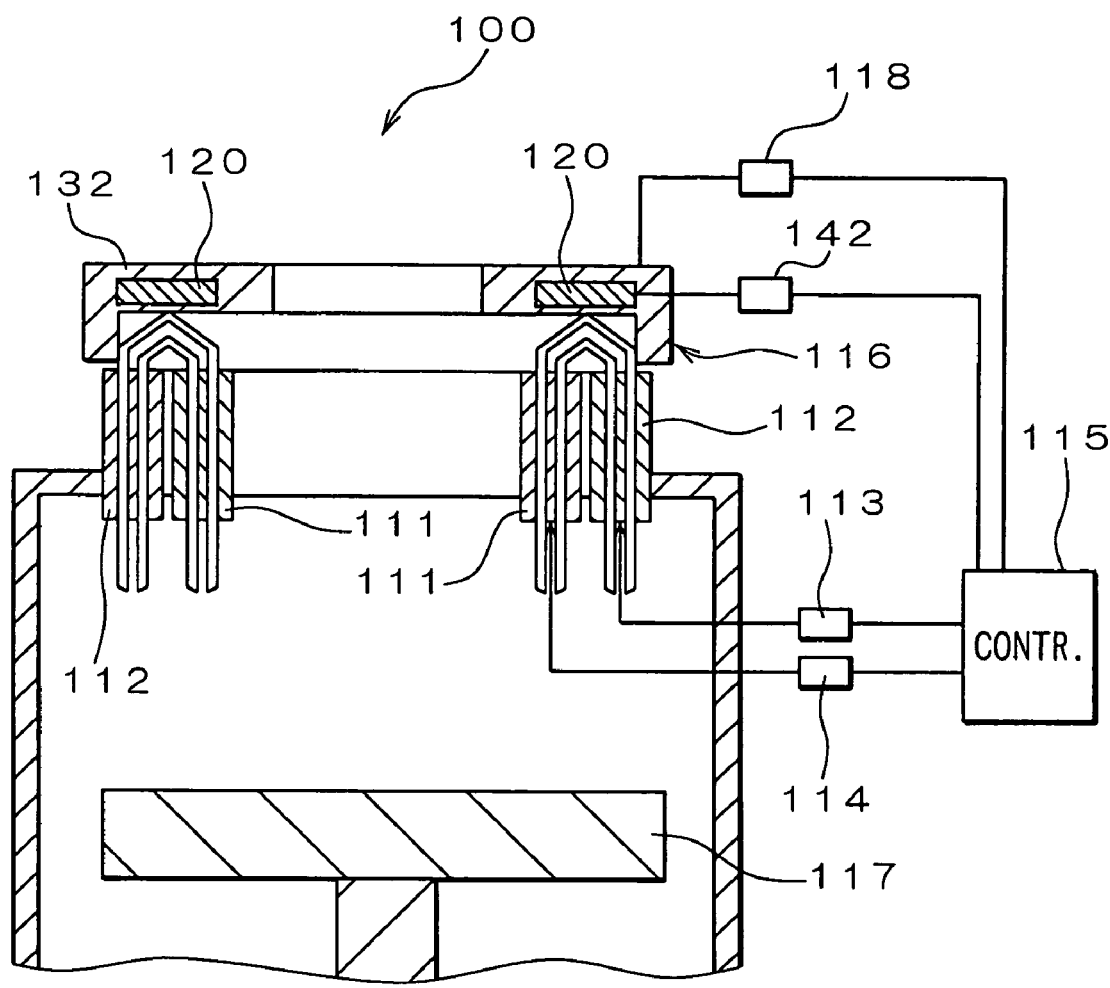
FIG. 9 is a cross-sectional view of a twisting apparatus that includes a turn portion twisting tool.
Figure 10:
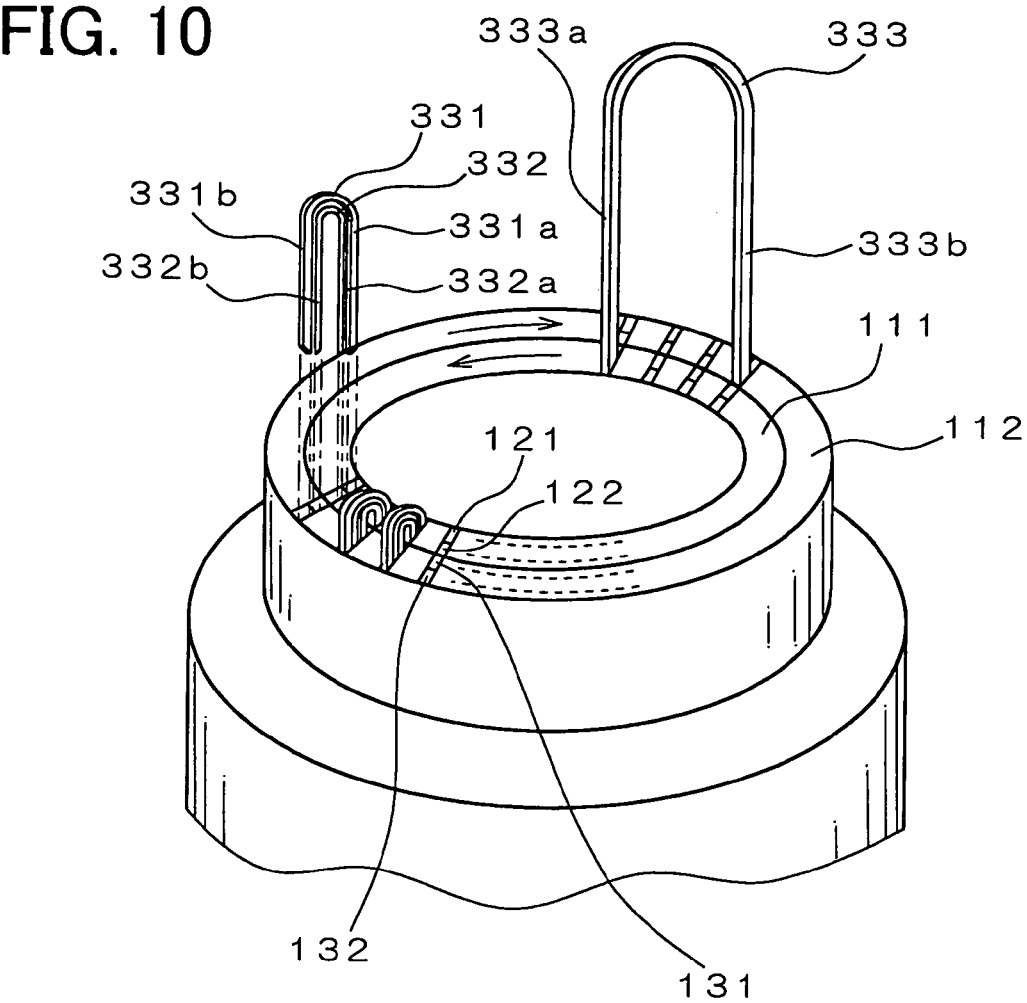
FIG. 10 is a perspective view of the turn portion twisting tool with first and second conductor segments being loaded therein.

The above twisting step will be described in more detail. FIG. 9 is a cross-sectional view illustrating a twisting apparatus that includes a turn-portion twisting tool. FIG. 10 is a perspective view illustrating the turn-portion twisting tool with conductor segments mounted therein.

The twisting apparatus 100 includes the turn-portion twisting tool that is constituted of an inner twisting tool 111 and an outer twisting tool 112, turning mechanisms 113, 114 that respectively turn the inner and outer twisting tools 111, 112, a controller 115, a segment-pressing tool 116, a segment-pushing-up tool 117, a hoisting mechanism 118, etc.

The inner twisting tool 111 has a plurality of circumferentially aligned pairs of radially aligned holding slots 121 and 122 in which the straight portions 331*a*, 332*a* of the large and small conductor segments 331, 332 are respectively inserted. The number of the pairs of the holding slots 121, 122 corresponds to the number of the slots 35 of the stator core 2. That is, the thirty six (36) holding slots 121 and the thirty six (36) holding slots 122 are respectively formed in the circumferential direction at equal intervals to be coaxial. The outer twisting tool 112 also has a plurality (e.g. 36) of circumferentially aligned pairs of coaxially aligned holding slots 131 and 132. As a result, the inner twisting tool 111 and the outer twisting tool 112 have circumferentially aligned thirty six groups of radially aligned four-holding-slots 121, 122, 131, 132 in the order from the innermost side thereof.

The large conductor segments 331 and the small conductor segments 332 with some lead-specialized conductor segments 333 are inserted into all the holding slots 121, 122, 131, 132, and the annular segment pressing tool 116 is moved down toward the inner twisting tool 111 and the outer twisting tool 112 to press the turn portions 331*c* of the large conductor segments 331. Therefore, in the twisting step, the large conductor segments 331 and the small conductor segments 332 are prevented from jutting up from the holding slots 121, 122, 131, 132 in the axial direction.

Figure 11:
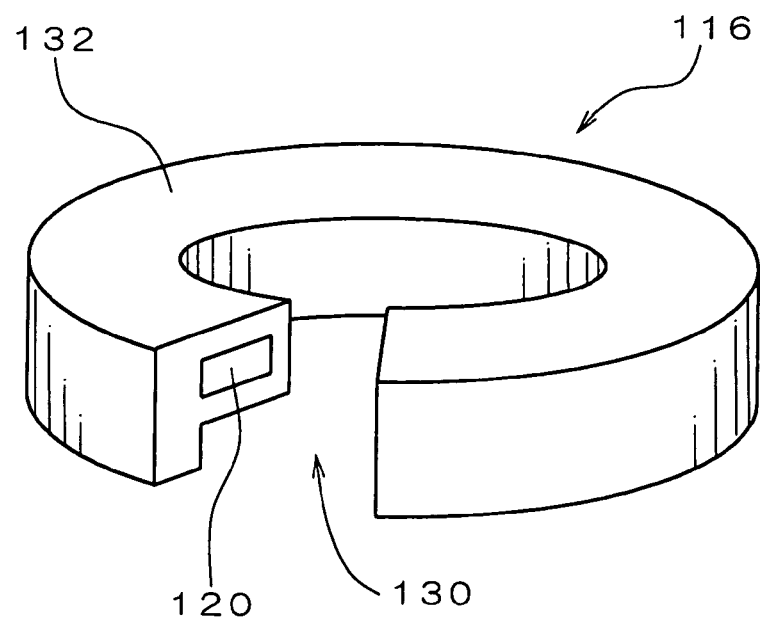
FIG. 11 is a perspective view illustrating a segment pressing tool.

FIG. 11 is a perspective view illustrating the segment pressing tool 116. As illustrated in FIG. 10, the large conductor segments 331 and the small conductor segments 332 are loaded into the turn portion twisting tool together with the long lead-specialized conductor segments 333. Therefore, if the lead-specialized conductor segments 333 are inserted into the holding slots of the inner and outer twisting tools 111, 112 so that the ends thereof that extend in the direction opposite the turn portion can be leveled with those of the large conductor segments 331 and the small conductor segments 332, the turn portions 333*c* jut out from the turn portions 331*c* of the large conductor segments 331. Therefore, the segment pressing tool 116 has a top plate 132 that is provided with a recess 130 for passing the lead-specialized conductor segments 333 in the axial direction, so that the tool 116 does not interfere the lead-specialized conductor segments 333 when the tool 116 presses the turn portion 331*c* of the large conductor segments 331. The top plate 132 has an accommodation space 144 for accommodating a circumferentially movable top plate 120 to partly close the recess 130 at the middle in the cross-section thereof. Although one recess formed at a portion of the segment pressing tool 116 is shown in FIG. 11, three recesses are formed in the circumferential direction to pass six lead wires that are extended from the Y-connected three-phase stator winding 31.

Figure 12:
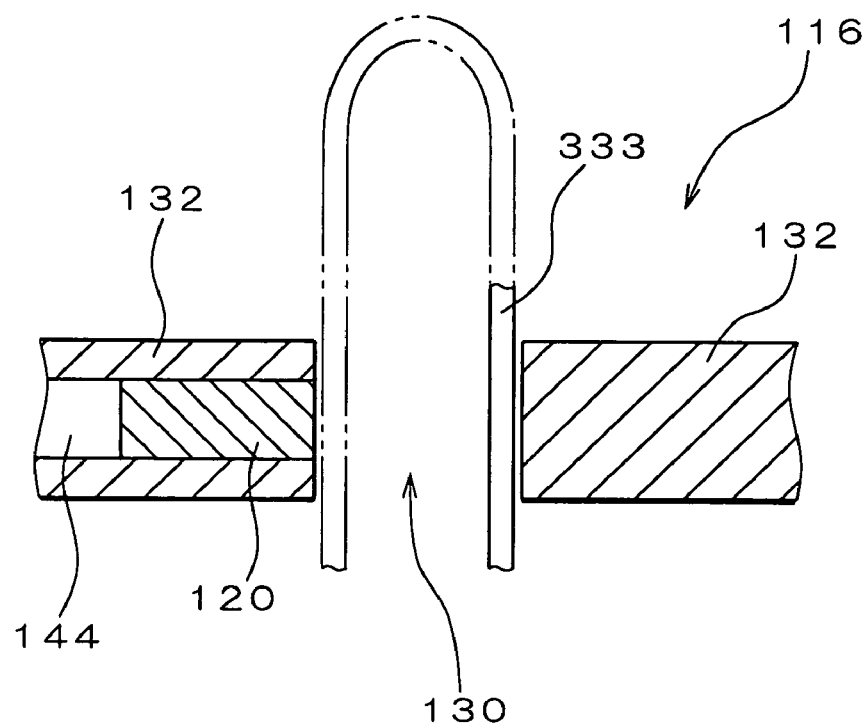
FIG. 12 is a cross-sectional side view illustrating the segment pressing tool.
Figure 13:
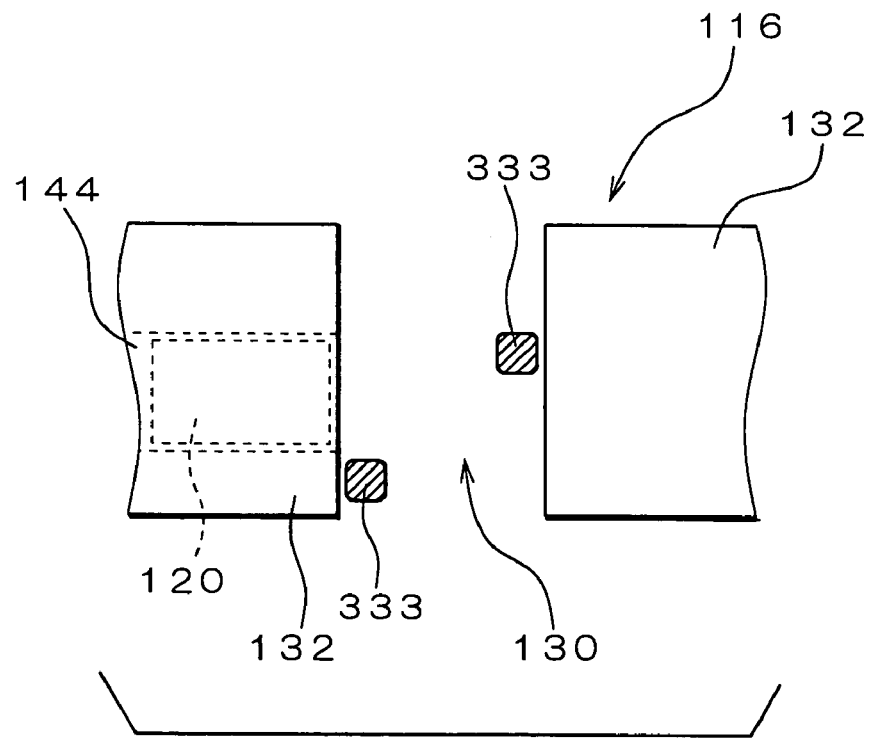
FIG. 13 is a fragmentary plan view illustrating a portion around a recess.

FIG. 12 is a cross-sectional side view illustrating the segment pressing tool 116 in the circumferential direction. FIG. 13 is a fragmentary plan view illustrating a portion around the recess 130. As shown in the figures, the stationary top plate 132 has the accommodation space 144 therein to accommodate the movable top plate 120.

The above described segment pressing tool 116, which is illustrated in FIG. 9, moves down to press the turn portions of the large and small conductor segments 331, 332. The movable top plate 120 is kept in the accommodation space of the stationary top plate 132 until the segment pressing tool 116 passes the turn portions 333*c* of the lead-specialized conductor segments 333. The movable top plate 120 accommodated by the stationary top plate 132 slides in the circumferential direction to close the recess 130 while segment pressing tool 116 passes the turn portions 333*c* of the lead-specialized conductor segments 333 and continues moving down. Thereafter, the movable top plate 120 moves in the axial direction until the surface thereof in contact with the large conductor segments 331 and others (position of the top plate 120 on the side of the turn portions) reaches the same level as the stationary top plate 132. The sliding mechanism 142 is controlled by the controller 115 so that the movable top plate 120 can stop moving down before the segment pressing tool 116 stops moving down.

Figure 14:
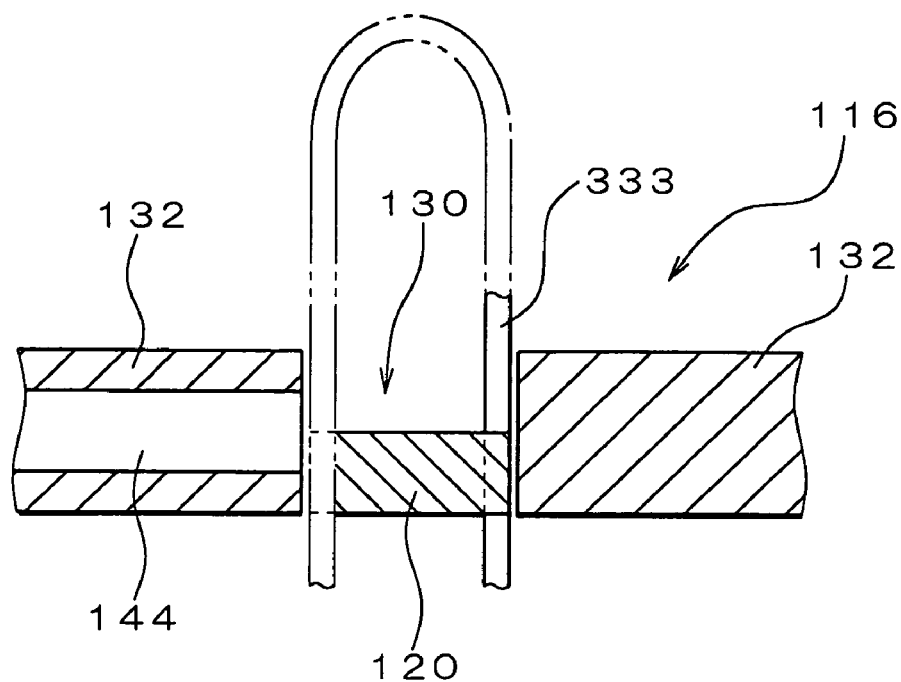
FIG. 14 is a cross-sectional side view illustrating the segment pressing tool after a movable top plate stops moving.
Figure 15:
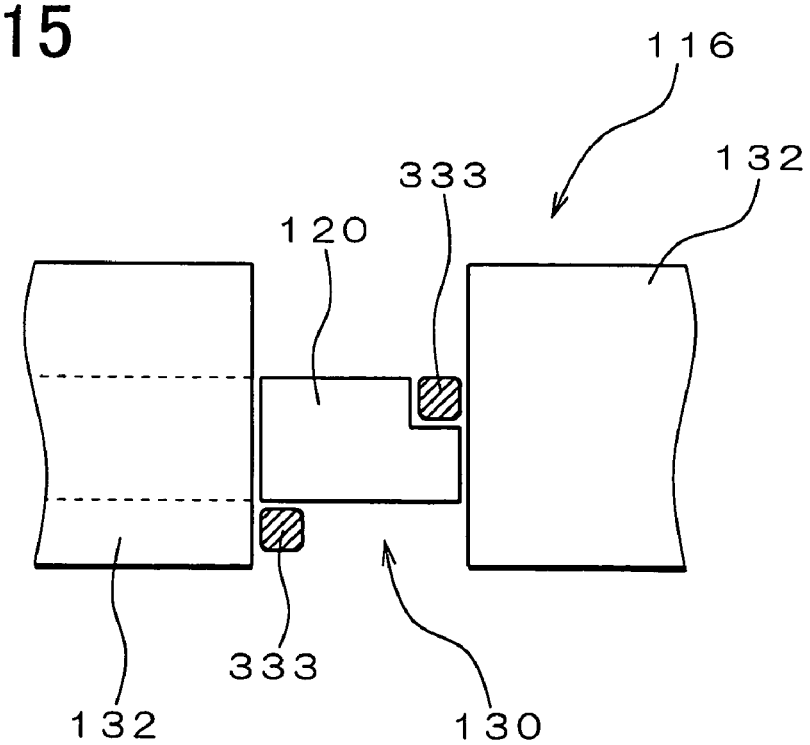
FIG. 15 is a fragmentary plan view illustrating the movable top plate after it stops moving.

FIG. 14 is a cross-sectional side view illustrating the segment pressing tool 116 after the movable top plate 120 stops moving. FIG. 15 is a fragmentary plan view illustrating the movable top plate 120 after moving, in more detail. As shown in these figures, the movable top plate 120 after moving in the circumferential direction closes the recess 130 for passing the lead-specialized conductor segments 333. Therefore, the turn portions of the large conductor segments 331 and the small conductor segments 332 that are disposed at positions that correspond to the recesses 130 can be pressed by the movable top plate 120. As a result, in the twisting step, the axial position of these large and small conductor segments 331, 332 can be surely restrained.

When the segment pressing tool 116 starts moving down, the movable top plate 120 is accommodated in the accommodation space 144 of the stationary top plate 132, so that the recesses 130 are opened. Therefore, the lead-specialized conductor segments 333 that have a U-shape are not obstructed when they are loaded from the turn-portion side.

Figure 16:
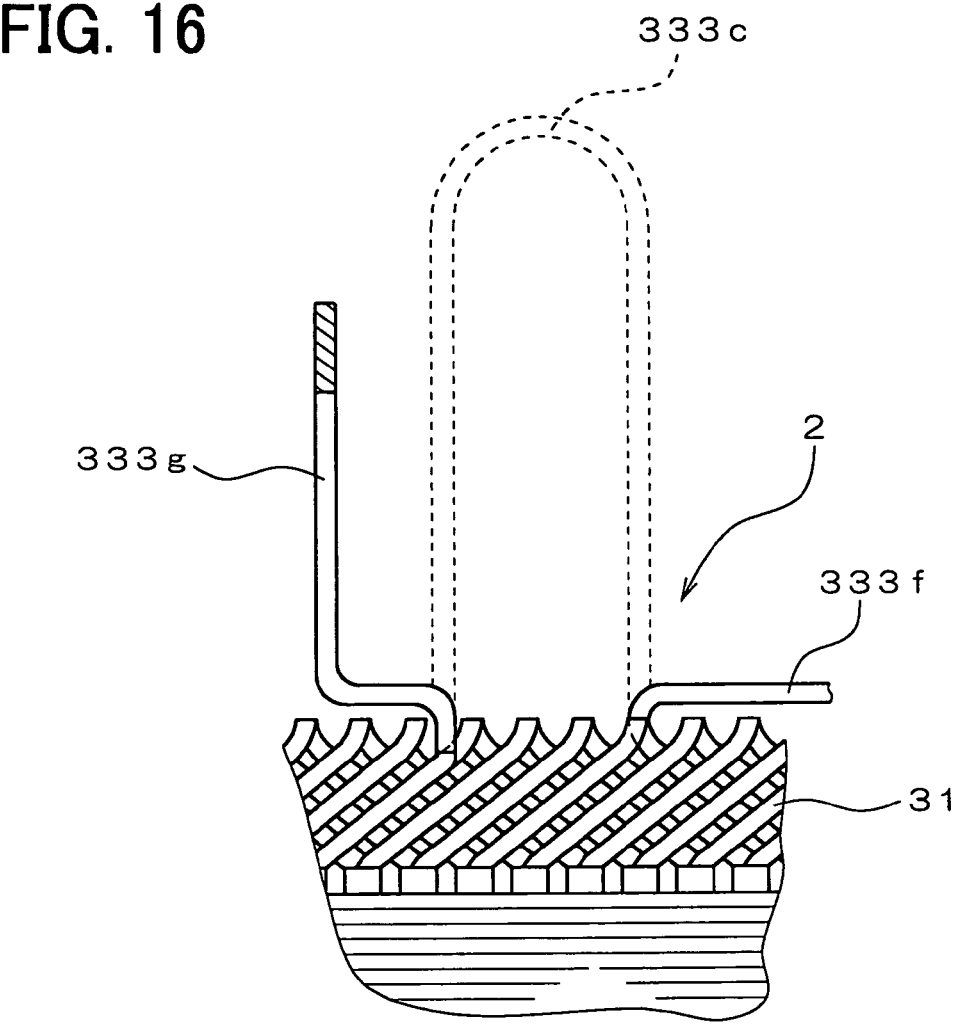
FIG. 16 is a fragmentary side view illustrating a stator with lead wires.

The U-shaped lead-specialized conductor segment can be used even if the straight portions 333a, 333b are disposed to be away from each other in the circumferential direction. As shown in FIG. 16, two lead wires 333g, 333f can be readily provided only by cutting at least one portion near the turn portion 333c.

The accommodation space is formed in the stationary top plate 132 of the segment pressing tool 116 to move the movable top plate 120 in the circumferential direction in the above described embodiment. However, the movable top plate can be disposed at outside or inside the recess 130 in the radial direction so as to move the movable top plate in the radial direction to close the recess 130.

A method according to the second embodiment of the invention will be described with reference to FIGS. 17–19.

Figure 17:
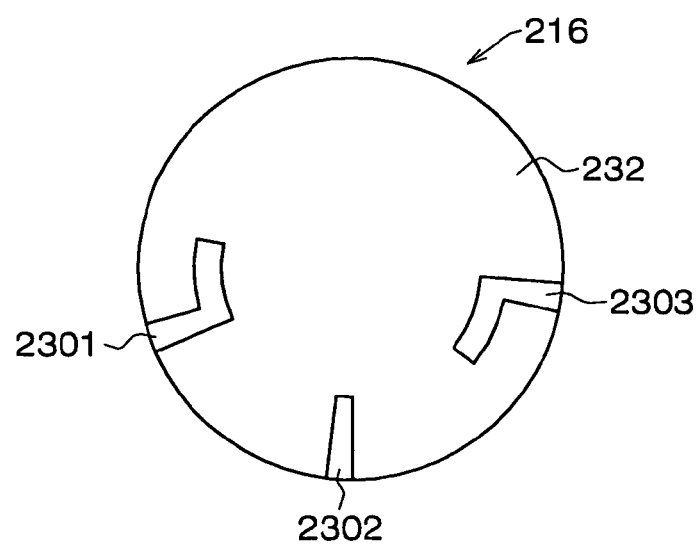
FIG. 17 is a schematic plan view illustrating a stationary top plate applied to a method according to the second embodiment of the invention.

FIG. 17 is a schematic plan view illustrating a stationary top plate 232 of a segment pressing tool 216. The stationary top plate 216 has three recesses 2301, 2302 and 2303 spaced apart from each other in the circumferential direction. Two recess 2301 and 2302 have circumferentially extending groove at radially inner portion of the stationary top plate 232 from which the straight portions of the lead-specialized segments 333 can protrude. Therefore, the segment pressing tool 216 can be applied to various stator windings that have various lead-specialized segments 333 whose straight portions have different circumferential pitch.

Figure 18A:
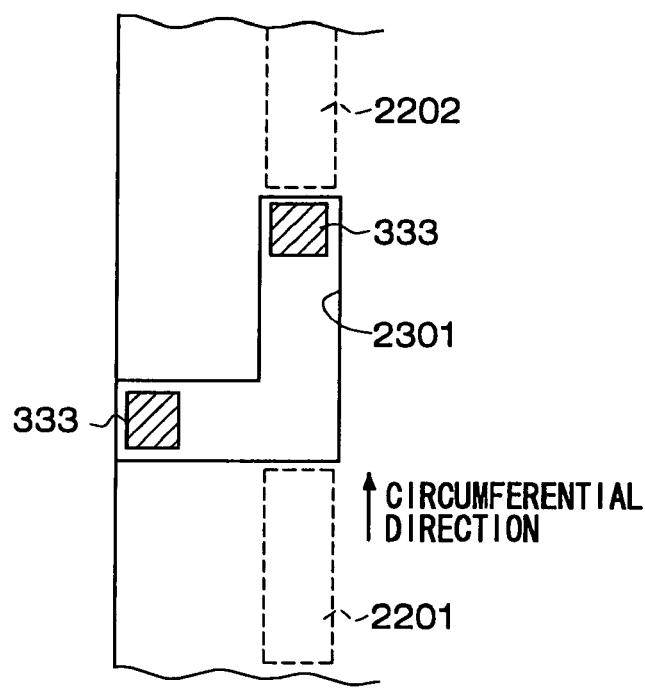
FIGS. 18A and 18B are schematic diagrams illustrating operation of movable top plates for the method according to the second embodiment.
Figure 18B:
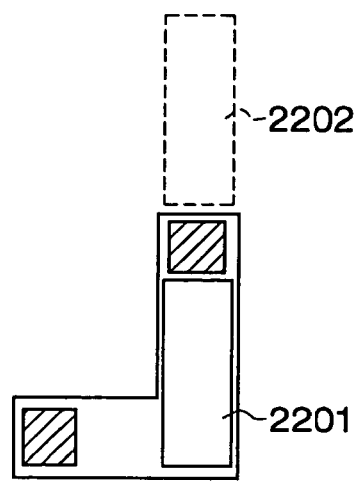
Figure 19:
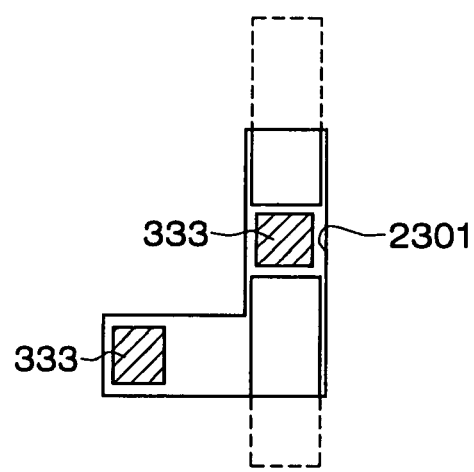
FIG. 19 is a schematic diagram illustrating a variation of the operation or the movable top plates.

FIGS. 18A and 18B are schematic diagrams illustrating operation of a movable top plate 2201 in one of the recesses, for example, the recess 2301. After the straight portions of the lead-specialized conductor segment 333 are inserted into the recess 2301 while a movable top plate 2201 opens the recess, the movable top plate 2201 is moved in the circumferential direction to press the turn portions of the large conductor segment 231 at the bottom surface of the movable top plate 2201, in the same manner as above. If one of the straight portions of the lead-specialized conductor segment is located at the end of the circumferential groove, only one movable top plate 2201 is necessary to press the turn portions of the large conductor segments. On the other hand, another movable top plate 2202 is necessary to press the turn portion of the large conductor segment 331, as illustrated in FIG. 19 if the straight portion of the lead-specialized conductor segment 333 is located at the middle of the circumferential groove of the recess 2301.

In the foregoing description of the present invention, the invention has been disclosed with reference to specific embodiments thereof It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing a stator winding mounted in a stator core of a rotary electric machine including a plurality of first U-shaped conductor segments having a turn portion and a pair of first straight portions disposed in a radial direction and a second U-shaped conductor segment having a turn portion and a pair of second straight portions disposed at positions shifted from each other in a circumferential direction, wherein the second straight portions are longer in the axial direction than the first straight portions, said method comprising:
   a twisting step of circumferentially moving the first straight portions and the second straight portions while restraining the turn portions of the first conductor segments in the axial direction by a pressing tool, an inserting step of inserting the previously twisted first and second conductor segments into respective slots formed in the stator core, a bending step of bending the first and second straight portions at ends opposite the turn portions thereof in the circumferential direction,
   a joining step of joining the previously bent first and second conductor segments adjacent to each other,
   wherein the pressing tool comprises a stationary top plate that has a recess and a movable top plate that is movable to close the recess, and
   the second straight portions are inserted to the recess to protrude therefrom and the movable top plate is closed after inserting of the second straight portions.

2. The method of manufacturing a stator winding according to claim 1,
   wherein the stationary and movable top plates are disposed to be the same axial position at the respective sides on the turn portions.

3. The method of manufacturing a stator winding according to claim 1,
   wherein the movable top plate is disposed at a circumferential position adjacent to the stationary top plate and circumferentially moves to the recess before the second straight portions are moved at said twisting step and after the second straight portions are inserted into the recess.

4. The method of manufacturing a stator winding according to claim 1,
   wherein a lead of each phase winding of the stator winding is formed by cutting at least a portion of the second conductor segments after said joining step.

5. A method of manufacturing a stator winding mounted in a stator core of a rotary electric machine including a plurality of first U-shaped conductor segments having a turn portion and a pair of first straight portions disposed in a radial direction and a second U-shaped conductor segments having a turn portion and a pair of second straight portions disposed at positions shifted from each other in a circumferential direction, wherein the second straight portions are longer in the axial direction than the first straight portions, said method comprising:
   a twisting step of circumferentially moving the first straight portions and the second straight portions while restraining the turn portions of the first conductor segments in the axial direction by a pressing tool, an inserting step of inserting the previously twisted first and second conductor segments into respective slots formed in the stator core, a bending step of bending the first and second straight portions at ends opposite the turn portions thereof in the circumferential direction, a joining step of joining the previously bent first and second conductor segments adjacent to each other, wherein the pressing tool comprises a stationary top plate that has a circumferentially extending groove, and the second straight portions are inserted to the groove to protrude therefrom and the movable top plate is closed after inserting of the second straight portions.

6. The method as claimed in claim 5, wherein the recess has a radially extending groove from an outer periphery of the stationary top plate to form an L-shape recess for passing both straight portion of the second conductor segment therethrough.

* * * * *